K. FINKENZELLER.
FODDER PURIFYING AND PREPARING MACHINE.
APPLICATION FILED APR. 20, 1911.
1,036,476.
Patented Aug. 20, 1912.
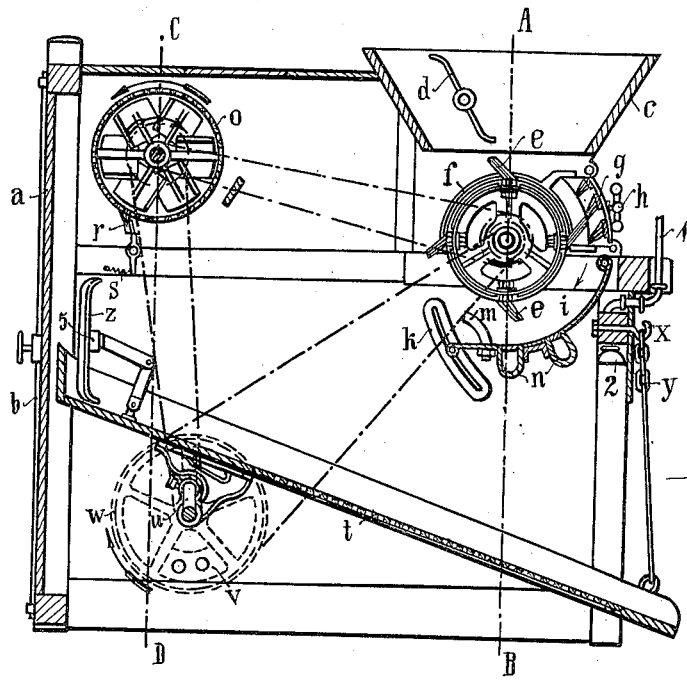
Fig. 1.
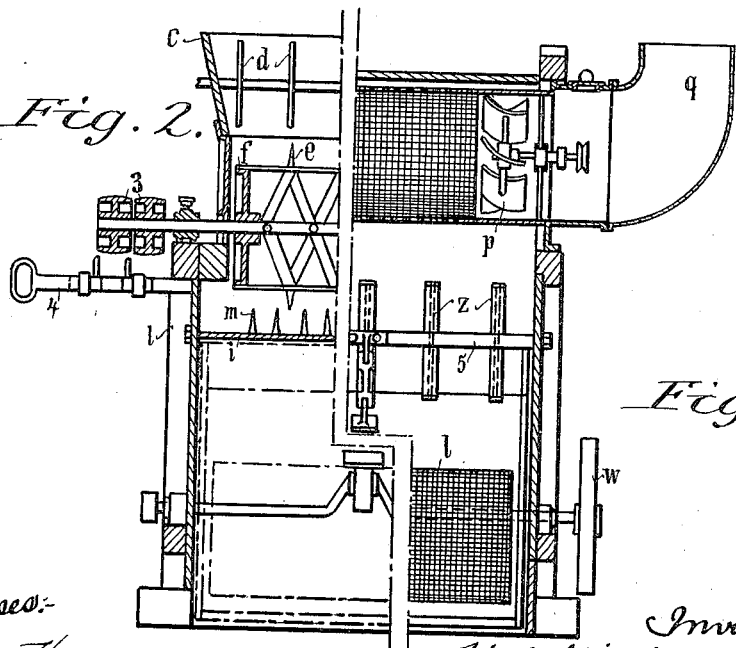
Fig. 2.
Fig. 3.
Witnesses:-
Geo. C. Heinicke,
B. Gleichman
Inventor:-
Karl Finkenzeller
by B. Singer
atty.

UNITED STATES PATENT OFFICE.

KARL FINKENZELLER, OF FREIBURG, BADEN, GERMANY.

FODDER PURIFYING AND PREPARING MACHINE.

1,036,476.  Specification of Letters Patent.  Patented Aug. 20, 1912.

Application filed April 20, 1911. Serial No. 622,214.

*To all whom it may concern:*

Be it known that I, KARL FINKENZELLER, a subject of the Grand Duke of Baden, residing at Freiburg, Baden, Germany, have invented certain new and useful Improvements in Fodder Purifying and Preparing Machines, of which the following is a specification.

My invention relates to an improved apparatus for preparing fodder and removing dust from the same.

Good fodder must be free from dust, mold, fungi, and the like, and also must be fed to the cattle in a somewhat open and not compressed condition in order to be nutritious and appetizing.

By the present invention, the fodder is subjected by means of an automatic machine to such treatment that fodder originally possessing very undesirable qualities is delivered from the machine in an appetizing and immediately utilizable form. This is effected firstly by tearing open the parts of the fodder and subsequently throwing them out during which the dust and other impurities are removed by the aid of a fan, while the hay flowers and other particles of nutriment, even small ones, are left behind in the fodder and the nutritive value thereof is therefore not diminished although in quality a higher value is attained. By means of the opening up and rendering loose of the particles of the fodder, the appetite of the cattle is encouraged and the animals can digest it better. A further means for increasing the flavor of the fodder consists in irrigating with salt water or other appetizing ingredients which can be added to the prepared fodder as it comes out of the machine.

The preparation of the fodder is effected in three operations so that there is no violent treatment which would destroy the filaments. Firstly with the aid of auxiliary devices in the supply hopper the fodder is conducted to a toothed drum which draws it around, opens it up by the aid of counter-teeth separating each particle of fodder from the other and delivers it over an adjustable chute.

The second preparation process comprises the time from the delivery from the chute and the removal of the dust and impurities by means of a fan. By means of the rotating toothed drum, the fodder is already agitated with very considerable speed, a speed which is still further increased by the air suction so that the opened up fodder is kept floating for an instant and at this moment the particles of dust are quickly released and aspirated through the sieve surrounding the fan and driven into the outer air through a delivery pipe.

During the third period of the operation, a shaking up and separating of the fodder takes place over the delivery sieve. During this time there is still aspirated through the fan any dust which has not already been removed, whereas other particles fall through the shaking sieve.

By the aid of special scrapers on the shaking sieve the fodder is so aerated and shaken up that the aforesaid advantages are realized to the full extent. Magnets may be arranged either at the exit from the rotary drum or on the shaking sieve which will retain any particles of iron which may exist in the fodder and by the aid of a nozzle the fodder can have mixed with it at the delivery point a flavoring liquid of any kind.

A construction of the invention is illustrated in the drawing as follows:

Figure 1 shows a longitudinal section through the machine. Fig. 2 a half section through the machine on the line A—B of Fig. 1. Fig. 3 a half section through the machine on the line C—D of Fig. 1.

The frame in which the machine is constructed is inclosed with doors and other means of access in such a manner that easy approach can be obtained to all the working parts. Especially the part where the sifting drum is placed is made easy of access by means of two large doors *a* which are closed by the locking handles *b*. The supply of the fodder takes place through the hopper *c* in which there are S-shaped bent rotating rods *d* which facilitate a uniform delivery of the fodder to the toothed drums. The supply of the hopper *c* can be by means of a lift or the like. Through the hopper *c*, the fodder passes to the drum *f* made of flat iron rods and provided with teeth *e*. These teeth are somewhat sloping and their inclination is opposite to that of the rotation so that there are no corners in which particles of fodder can remain hanging. Upon the machine frame itself are placed corresponding sloping teeth *g* which with the aid of a worm gear can be adjusted as regards their position to the drum *f* by means of the outer handle *h*.

The delivery chute *i* is arranged concentrically with the drum and supported on pivots so that it can be adjusted by means of the slot *k* and set screws *l* at any desired distance from the toothed drum. Upon this chute *i* are placed cutters *m*, and if desired magnets *n* which are arranged on it in any convenient manner.

Somewhat raised above the toothed drum *f* there is placed a drum sieve *o* close to the door *a* and this is rotated by means of a belt and pulley. In this rotating sieve drum is placed the fan *p*, the driving axle of which projects through the bearing of the sieve drum *o* and is preferably rotated in the opposite direction to that of the drum. The sieve drum runs at the side nearest to the fan in a tube *q* through which the dust is taken away to any suitable place. A brush *r* extending over the entire width of the sieve drum is pressed against it by means of a spring *s* and keeps the sieve drum free from particles of fodder during the whole operation so that it can act freely.

Over the whole width of the machine under the toothed drum and sieve drum there extends the sloping screen or sieve *t* which is moved to and fro and at the same time up and down by means of a crank and pulley *w*. The screen rests on the one hand upon the crank *u* and is suspended on the other hand from a hook *x* by the aid of chains *y* preferably so as to be adjustable in its inclination.

At a suitable point beneath the sieve drum there are placed irons *z* attached to a common pivotally supported rod 5, which are thrown up by the action of the screen *t* and breaks up the fodder falling upon them so that even in the most difficult cases in which the fodder is completely clotted together a thorough breaking up and aerating is effected.

At the outlet point there is a pipe *l* ending in a nozzle 2 and connected with a receptacle placed at a convenient point for the purpose of adding to the fodder essences or ingredients which increase its appetizing qualities.

The driving of the machine is effected by means of fast and loose pulleys 3 in the well known manner by a belt and pulley 4 connected to the toothed drum *f*. As all the moving parts are driven from the toothed drum it follows that the speed of them all will be regulated thereby and therefore the speed of the entire machine can be adjusted according to circumstances without the possibility of choking or breakage. The driving of the crank shaft from the toothed drum is effected by the pulley *w* and the sieve drum is driven by a pulley on the crank shaft, while the fan is again driven directly from the toothed drum.

Having now particularly described and ascertained the nature of my said invention and in what manner the same is to be performed, I declare that what I claim is:

1. A fodder purifying and preparing machine comprising in combination, mechanism for flinging the fodder in a predetermined direction, a revoluble drum sieve disposed transversely in the path of the fodder flung from said mechanism, a suction device in coöperation with said drum head for removing the particles of matter carried by the fodder and capable of passing through the mesh of said sieve, and means for removing the fodder from said drum sieve after having been acted upon by said suction device.

2. A fodder purifying and preparing machine comprising in combination, mechanism for successively loosening and flinging the fodder in a predetermined direction, a revoluble drum sieve disposed transversely in the path of the fodder flung from said mechanism, suction device in coöperation with said drum sieve for removing the particles of matter carried by the fodder and capable of passing through the mesh of said sieve, and yieldable means for removing the fodder from said drum sieve after having been acted upon by said suction device.

3. A fodder purifying and preparing machine comprising in combination, mechanism for flinging the fodder in a predetermined direction, a revoluble drum sieve disposed transversely in the path of the fodder flung from said mechanism, a suction device in coöperation with said drum sieve for removing the particles of matter carried by the fodder and capable of passing through the mesh of said sieve, and a yieldably mounted brush for removing the fodder from said drum screen after having been acted upon by said suction device.

4. A fodder purifying and preparing machine comprising in combination, a revoluble drum sieve, for delivering fodder exteriorly of said sieve in the direction of rotation thereof, a suction device in coöperation with said drum sieve for removing the particles of matter carried by said fodder and capable of passing through the mesh of said sieve, and a brush in contact with said sieve exteriorly thereof and disposed in succeeding relation thereto with respect to the zone of delivery of said fodder to said drum sieve.

5. A fodder purifying and preparing machine comprising in combination, a revoluble drum provided with a plurality of teeth, extending from the periphery thereof and rearwardly inclined with respect to the direction of rotation of said drum, a plurality of teeth adapted to retain a stationary condition with respect to the teeth of said drum and adapted to be adjusted toward or from the former, to coact therewith in loosening the fodder, a guide device in coaction with said revoluble drum to direct the loosened fodder in a predetermined path of movement, a revoluble drum sieve disposed transversely in the path of movement of the directed fodder, suction device in coöperation with said drum sieve for removing the particles of matter carried by the fodder and capable of passing through the mesh of said sieve, and means for guiding the fodder from said drum sieve after having been acted upon by said suction device.

6. A fodder purifying and preparing machine comprising in combination, a revoluble drum provided with a plurality of teeth extending from the periphery thereof and rearwardly inclined with respect to the direction of rotation of said drum, a plurality of teeth adapted to retain a stationary position with respect to the teeth of said drum and adapted to be adjusted toward or from the former to coact therewith in loosening the fodder, a curved guide plate disposed complementary to the peripheral half of the teeth of said drum to direct the fodder in a predetermined path of movement, said plate being so pivoted at one end, means for adjusting the free end of said plate to or from said drum, a revoluble drum sieve disposed transversely in the path of movement of the fodder, and a suction device in coöperation with said drum sieve for removing the particles of matter carried by the fodder and capable of passing through the mesh of said sieve.

7. A fodder purifying and preparing machine, comprising in combination, a revoluble drum provided with a plurality of teeth extending from the periphery thereof and rearwardly inclined with respect to the direction of rotation of said drum, a plurality of teeth adapted to retain a stationary position with respect to the teeth of said drum and adapted to be adjusted toward or from the former to coact therewith in loosening the fodder, a curved guide plate disposed complementary to the peripheral path of the teeth of said drum to direct the fodder in a predetermined path of movement, said plate being pivoted at one end, means for adjusting the free end of said plate to or from said drum, knives carried by said plate parallel with the path of movement of the fodder and coacting with the said teeth of said drum to cut the fodder, a revoluble drum sieve disposed transversely in the path of movement of the fodder, and a suction device in coöperation with said drum sieve for removing the particles of matter carried by the fodder and capable of passing through the mesh of said sieve.

8. A fodder purifying and preparing machine comprising in combination, a revoluble drum provided with a plurality of teeth extending from the periphery thereof and rearwardly inclined with respect to the direction of rotation of said drum, a plurality of teeth adapted to retain a stationary position with respect to the teeth of said drum, to coact therewith in loosening the fodder, a guide device in coaction with said revoluble drum, to direct the loosened fodder in a predetermined path of movement, a revoluble drum sieve disposed transversely in the path of movement of the fodder, a suction device in coöperation with said drum sieve for removing the particles of matter carried by the fodder and capable of passing through the mesh of said sieve, a receiving sieve, and means for imparting an oscillatory and reciprocatory movement of said sieve.

9. A fodder purifying and preparing machine comprising in combination, a revoluble drum provided with a plurality of teeth extending from the periphery thereof and rearwardly inclined with respect to the direction of rotation of said drum, a plurality of teeth adapted to retain a stationary position with respect to the teeth of said drum to coact therewith in loosening the fodder, a guide device in coaction with said revoluble drum to direct the loosened fodder in a predetermined path of movement, a revoluble drum sieve disposed transversely in the path of movement of the fodder, a suction device in coöperation with said drum sieve for removing the particles of matter carried by the fodder and capable of passing through the mesh of said sieve, mechanism for guiding the fodder from said drum sieve after having been acted upon by said suction device, a receiving sieve disposed in receiving proximity to said last mentioned mechanism, means for imparting an oscillatory and reciprocatory movement to said sieve, and mechanism for loosening the fodder after having been guided by said last mentioned means.

In testimony, that I claim the foregoing as my invention, I have signed my name in presence of two subscribing witnesses.

KARL FINKENZELLER.

Witnesses:
 SIEGFRID HAUSE,
 AUGUST OOSTERMAN.